(12) United States Patent
Hsieh

(10) Patent No.: US 6,554,478 B2
(45) Date of Patent: Apr. 29, 2003

(54) BEARING ASSEMBLY FOR A HEAT DISSIPATION FAN

(76) Inventor: Hsin-Mao Hsieh, No. 6, East Section, Chiao Nan Li, Industiral 6th Rd., Pingtung City, Pingtung Hsien (TW)

( * ) Notice: Subject to any disclaimer, the term of this patent is extended or adjusted under 35 U.S.C. 154(b) by 0 days.

(21) Appl. No.: 09/932,887

(22) Filed: Aug. 20, 2001

(65) Prior Publication Data

US 2003/0035601 A1 Feb. 20, 2003

(51) Int. Cl.$^7$ ............................................... F16C 33/74
(52) U.S. Cl. .................. 384/130; 384/279; 384/286; 384/297; 384/322
(58) Field of Search ................. 384/130, 107, 384/279, 195, 286, 397, 322, 415, 902, 113, 115, 114, 118, 119

(56) References Cited

U.S. PATENT DOCUMENTS

| | | | | |
|---|---|---|---|---|
| 5,281,035 A | * | 1/1994 | Lo | 384/279 |
| 5,441,386 A | * | 8/1995 | Hsieh | 384/279 |
| 6,024,496 A | * | 2/2000 | Shy | 384/279 |
| 6,102,675 A | * | 8/2000 | Hsieh | 384/397 |
| 6,336,745 B1 | * | 1/2002 | Horng et al. | 384/107 |

* cited by examiner

Primary Examiner—Christopher P. Schwartz
Assistant Examiner—Melanie Torres
(74) Attorney, Agent, or Firm—Pearne & Gordon LLP

(57) ABSTRACT

A bearing assembly for a heat dissipation fan includes a bearing and a cap. The bearing has multiple grooves peripherally defined in the cylindrical body and a room defined in the body to communicate with the through hole in the center of the body. The cap is securely mounted on top of the bearing so that lubricant is able to be stopped from further movement away from the room.

3 Claims, 6 Drawing Sheets

BEARING ASSEMBLY FOR A HEAT DISSIPATION FAN

BACKGROUND OF THE INVENTION

1. Field of the Invention

The present invention relates to a bearing assembly, and more particularly to a bearing assembly for a heat dissipation fan. The bearing assemble enables the lubricant to flow freely inside the heat dissipation fan without clogging by contaminant.

2. Description of Related Art

With reference to FIGS. 5 and 6, a conventional heat dissipation fan assembly (5) is composed of a housing (50), a stator (60), a bearing (70) and a rotor (80).

The housing (50) has a cylindrical seat (52) formed on a bottom plate (51) and provided with a lubrication chamber (521) having therein a friction pad (64) and a positioning groove (53) defined around the seat (52).

The stator (60) includes a sleeve (61) and a circuit board (62) securely connected to the sleeve (61). The bearing (70) has a centrally defined through hole (71) and the rotor (80) has a shaft (81) extending out to correspond to the through hole (71) of the bearing (70) and formed with a neck (82) at a free end of the shaft (81).

When the heat dissipation fan is assembled, the shaft (81) extends through the through hole (71), the sleeve (61) and a retaining plate (63) to allow the retaining plate (63) to be securely received in the neck (82) of the shaft (81). Then, the sleeve (81) is received in the groove (53) with the free end of the shaft (81) abutting the friction pad (64) and the retaining plate (63) received in the sleeve (61). After the assembly of the heat dissipation fan, it is noted that only the bottom of the lubrication chamber (521) of the housing (50) is closed, the top of the lubrication chamber (521) is open to the air, such that contaminant may fall into the lubrication chamber (521) and attach the periphery of the bearing (70). Eventually, the contaminant will clog the flow of lubrication oil inside the lubrication chamber (521) and thus causes the life span of the heat dissipation fan short. Furthermore, when the heat dissipation fan is in use, it can not be operated up-side-down for the lubrication oil in the lubrication chamber (521) may easily flow out of the lubrication chamber (521) to shorten the life of the fan.

Again, when the rotor (80) is in operation, the lubrication oil in the lubrication chamber (521) will flow upward along the shaft (81). However, when the shaft (81) is assembled inside the lubrication chamber (521), the downward movement of the shaft (81) together with the retaining plate (63) increases the pressure inside the lubrication chamber (521), which hinders the downward flow of the lubrication oil along the shaft (81) back to the lubrication chamber (521) and thus the lubrication oil on the shaft (81) will be gradually dried out and shortens the life of the entire assembly.

To overcome the shortcomings, the present invention tends to provide an improved bearing assembly to mitigate and obviate the aforementioned problems.

SUMMARY OF THE INVENTION

The primary objective of the present invention is to provide a bearing assembly having a cap securely mounted on top of the bearing to stop the lubrication oil from flowing outward to contaminate the heat dissipation fan.

Another objective of the invention is to provide the cap to be engaged with the bearing in an water tight manner such that the bearing assembly is able to operate in any angle without the worry of loss of lubrication oil.

Other objects, advantages and novel features of the invention will become more apparent from the following detailed description when taken in conjunction with the accompanying drawings.

DETAILED DESCRIPTION OF THE PREFERRED EMBODIMENT

Figure 1:
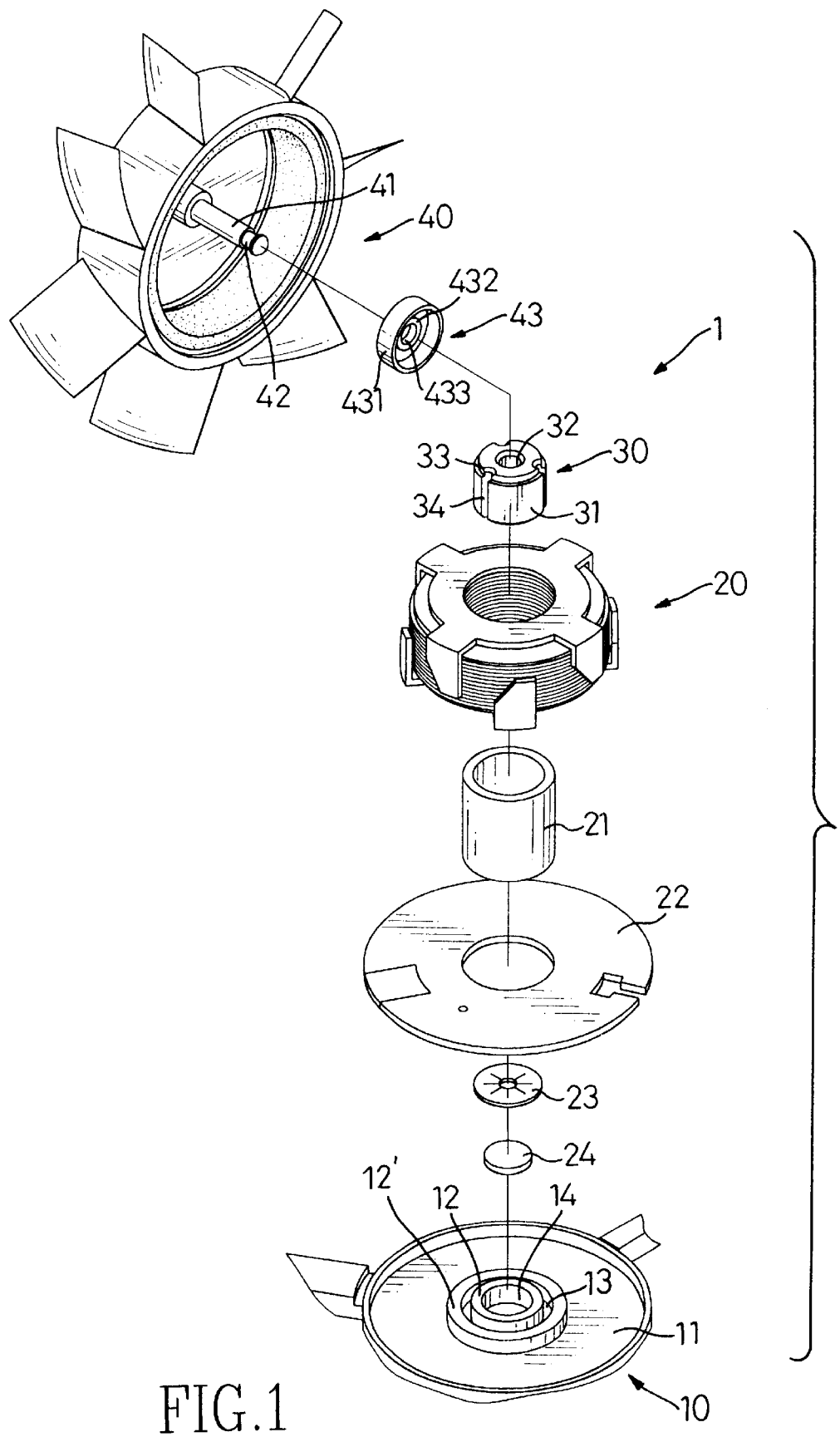
FIG. 1 is an exploded perspective view of the heat dissipation fan assembly in accordance with the present invention.

With reference to FIG. 1, a heat dissipation fan assembly (1) in accordance with the present invention has a base (10), a stator (20), a bearing (30) and a rotor (40).

The base (10) has a bottom plate (11) with a first and a second concentrically formed circular walls (12, 12'), a connection groove (13) defined between two circular walls (12, 12') and a chamber (14) surrounded by the first circular wall (12).

The stator (20) includes a cylindrical sleeve (21) having a size corresponding to the connection groove (13) so that the cylindrical sleeve (21) is able to be received in the connection groove (13), a circuit board (22), a retaining plate (23) and a friction pad (24).

Figure 2:
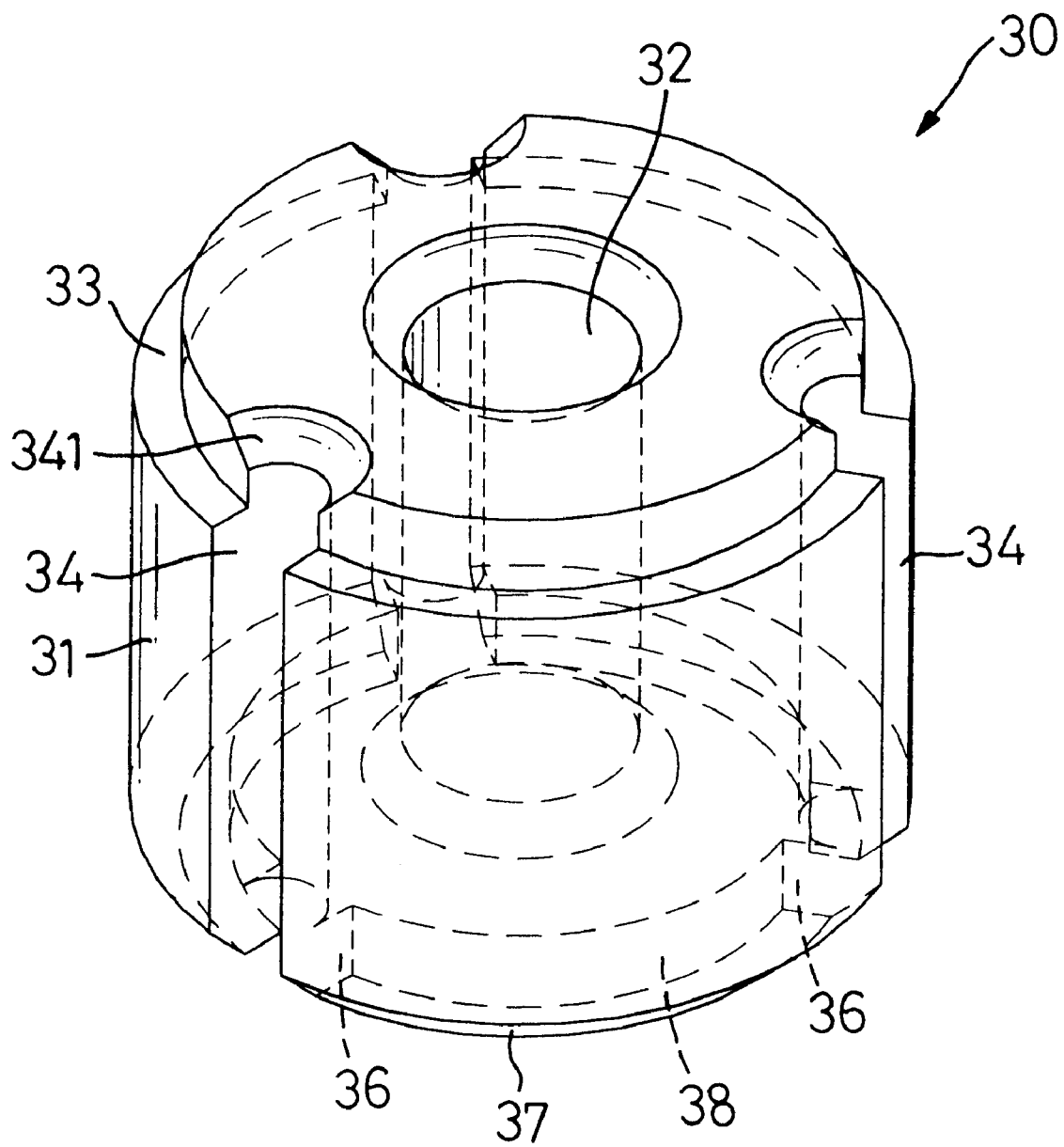
FIG. 2 is a perspective view of the bearing in accordance with the present invention.

With reference to FIG. 2, the bearing (30) has a cylindrical body (31), a through hole (32) defined through the cylindrical body (31), a truncated portion (33) formed on a top edge of the cylindrical body (31), multiple grooves (34) peripherally defined in the outer face of the cylindrical body (31) and respectively extending out from the top face and bottom face of the cylindrical body (31) to form an arcuate notch (341) and a cutout (36). The arcuate notch (341) communicates with the truncated portion (33) and the cutout (36) communicates with an oil room (38) formed inside the cylindrical body (31) and communicating with the through hole (32). A round face (37) is formed on the outer edge of the bottom face to facilitate the engagement with the sleeve (21).

A cap (43) is securely received in the sleeve (21) and provided with a skirt (431), a ring (432) extending from the inside of the skirt (431) and an opening (433) communicating with the through hole (32) of the bearing (30).

Figure 3:
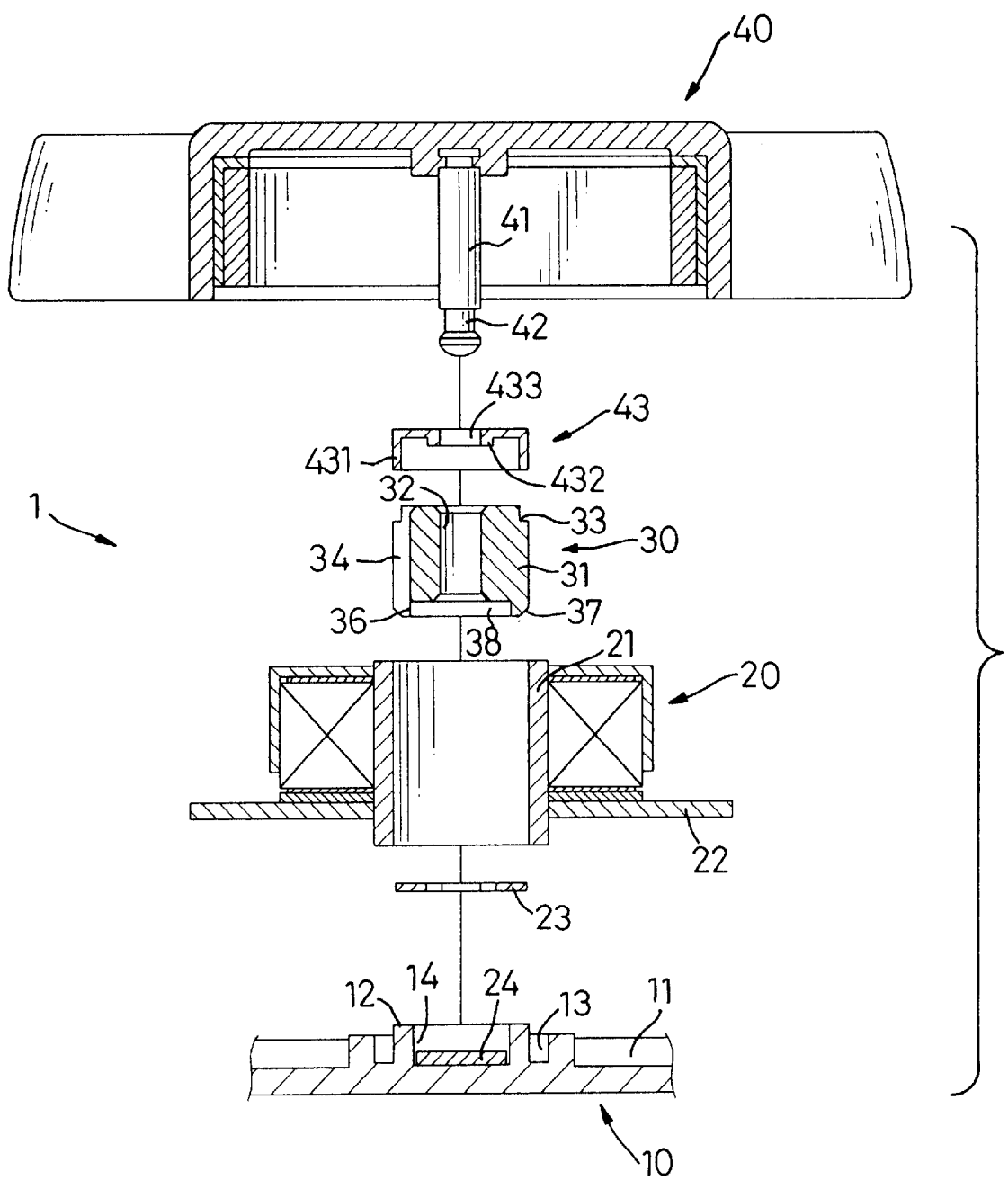
FIG. 3 is an exploded side plan view of the assembly in FIG. 1 with partial in section.
Figure 4:
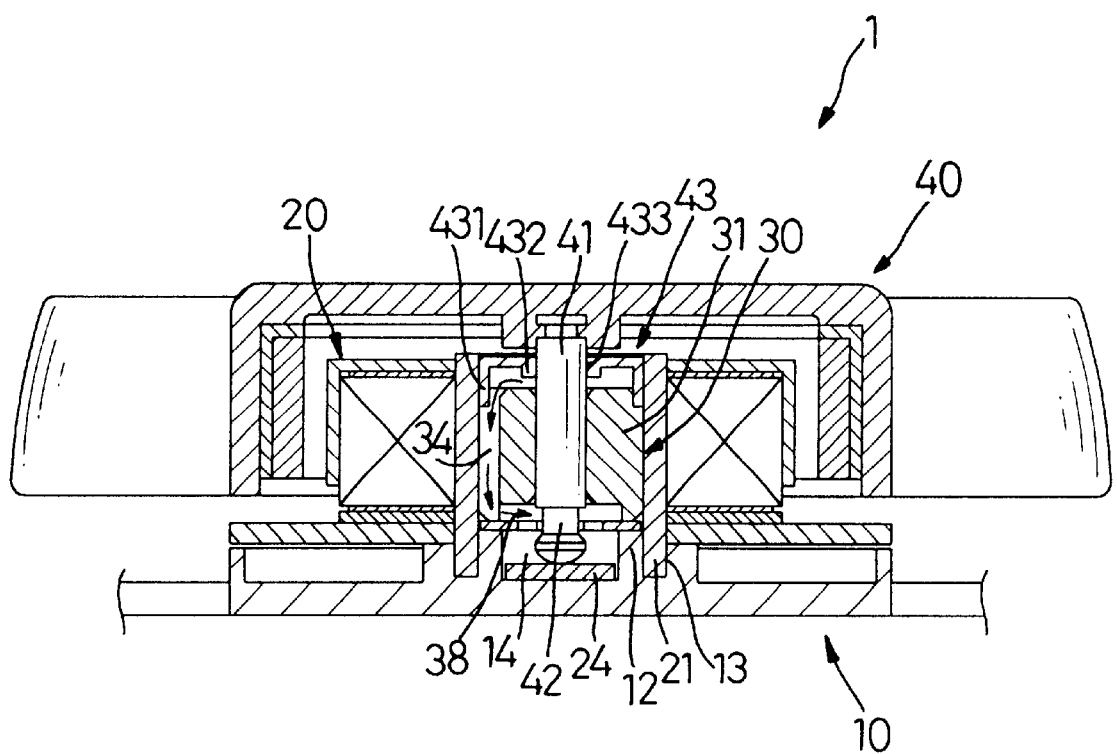
FIG. 4 is a cross sectional view of the assembled heat dissipation fan assembly.
Figure 5:
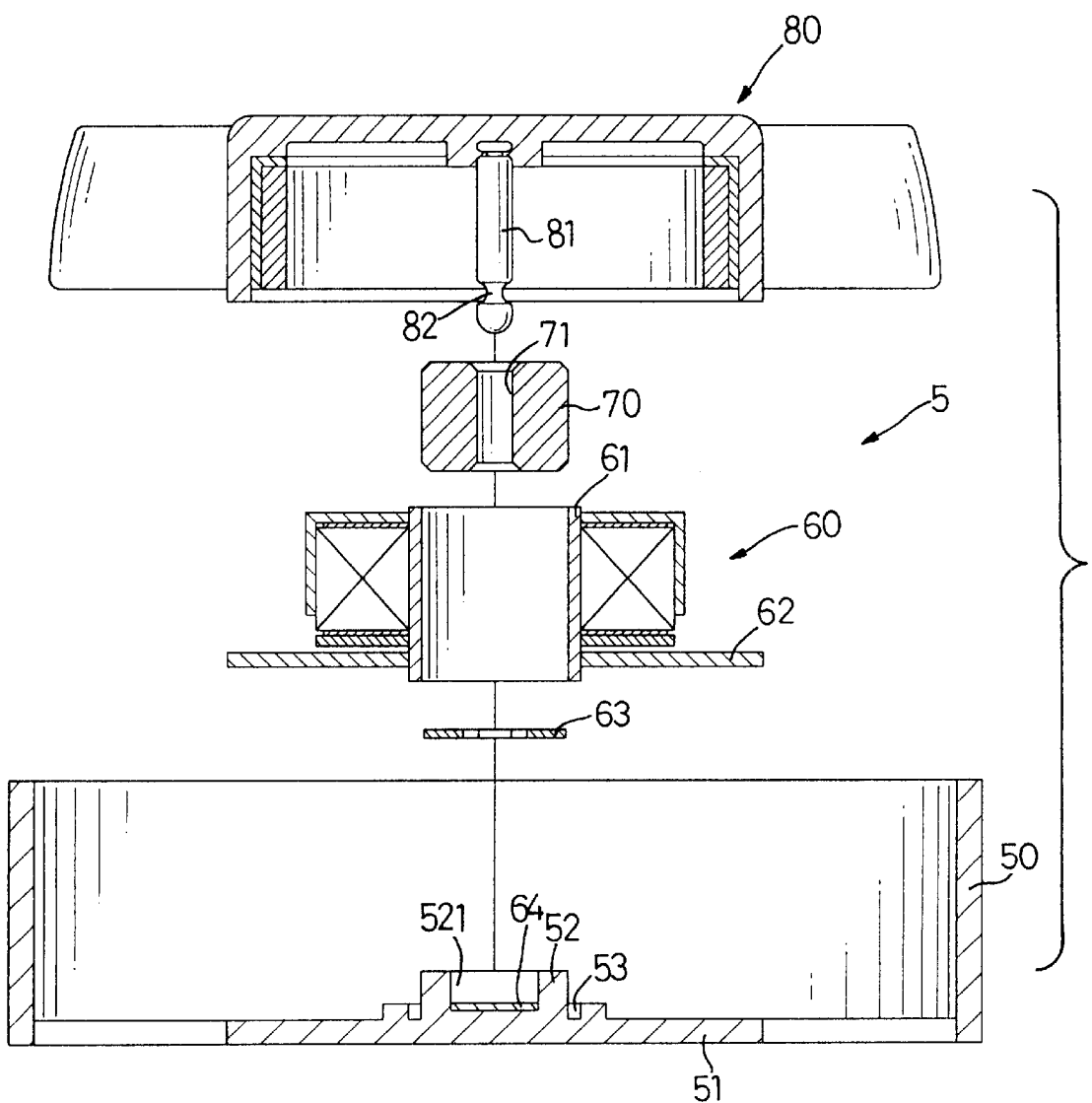
FIG. 5 is an exploded conventional heat dissipation fan in section.
Figure 6:
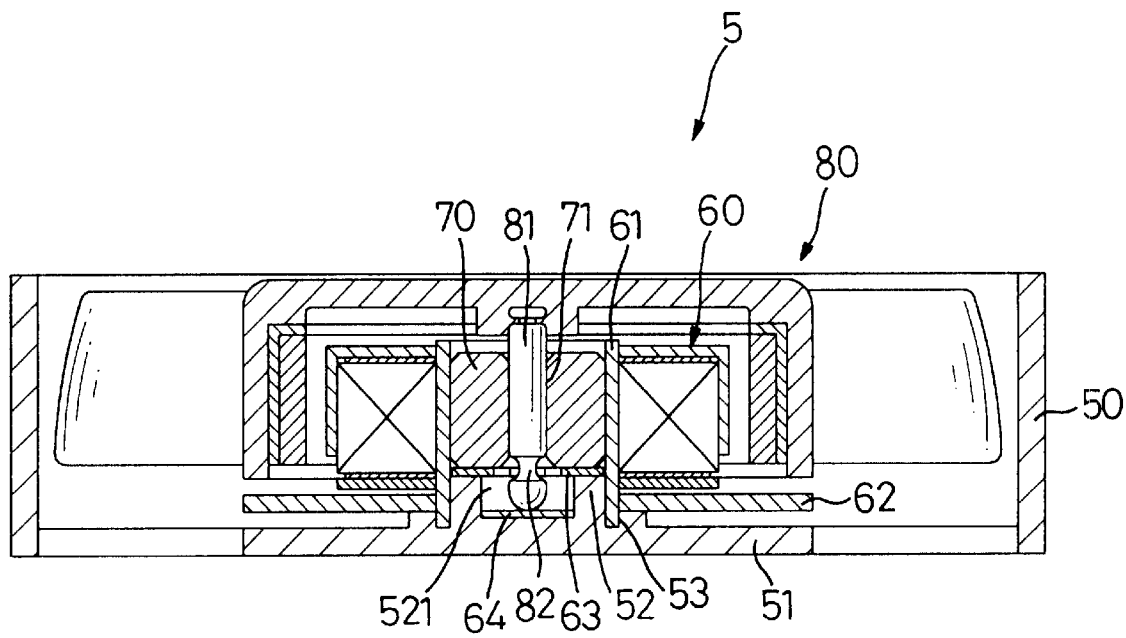
FIG. 6 is a cross sectional view of the assembled heat dissipation fan in FIG. 5.

With reference to FIGS. 3 and 4, when the foregoing assembly is assembled, the cap (43) securely engages with the bearing (30) at the truncated portion (33) and is received in the sleeve (21) which firmly engage with the circuit board (22). Then, the shaft (41) extends through the opening (433) of the cap (43), the through hole (32) of the bearing (30), the sleeve (21) and the retaining plate (23) to allow the retaining plate (23) to be securely retained at the neck (42) of the shaft (41). Thereafter, the friction pad (24) is first received in the chamber (14) and the sleeve (21) is securely received in the connection groove (13) to allow the distal end of the shaft (41) to abut the friction pad (24) in the chamber (14).

It is to be noted that after the assembly, the pressure inside the chamber (14) will not increase due to the downward assembly of the shaft (41) so that the upward movement of the lubricant from the chamber (14) will not be hindered. Therefore, when the rotor (40) operates, the lubricant in the chamber (14) is able to flow upward along the shaft (41) and downward by means of the grooves (34) to accomplish the entire lubrication cycle. Furthermore, because the cap (43) is received in the sleeve (21) in an water tight manner so that when the lubricant moves upward, the lubricant is stopped by the cap (43) and therefore, the bearing (30) is able to be utilized at any angle required without the worry of leakage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bearing assembly for a heat dissipation fan, the bearing assembly comprising:

a bearing adapted to be snuggly received in the sleeve of the heat dissipation fan; and a cap securely engaged with the bearing and adapted to be received in the sleeve in a water tight manner so as to prevent lubricant from further movement;

wherein the bearing further has a truncated portion formed to correspond to the cap such that the cap is able to seat on the truncated portion when combined with the bearing; and the cap has a skirt formed to engage with the truncated portion and an opening communicating with the through hole of the bearing so as to allow the shaft of the heat dissipation fan to extend therethrough, in assembly, the cap being engaged with the bearing in a water-tight manner such that the bearing assembly is able to operate in any angle without worry of loss of lubrication oil.

2. The bearing assembly as claimed in claim 1, wherein the bearing comprises:

a cylindrical body;

a through hole defined in the cylindrical body and adapted to allow the shaft of the heat dissipation fan to extend therethrough;

a round face formed on an outer edge of a bottom face of the cylindrical body in order to facilitate the engagement with the sleeve; and a room formed inside the cylindrical body to communicate with the through hole.

3. The bearing assembly as claimed in claim 2, wherein the bearing further has multiple grooves each extending to a top face and the bottom face of the cylindrical body to form an arcuate notch and a cutout respectively.

* * * * *